United States Patent [19]

Novoselsky

[11] Patent Number: 4,696,348

[45] Date of Patent: * Sep. 29, 1987

[54] POWER RAKE

[76] Inventor: Boris Novoselsky, 66-01 110th St., Apt. 1B, Forest Hills, N.Y. 11375

[*] Notice: The portion of the term of this patent subsequent to Jun. 24, 2003 has been disclaimed.

[21] Appl. No.: 830,052

[22] Filed: Feb. 13, 1986

Related U.S. Application Data

[63] Continuation-in-part of Ser. No. 720,260, Apr. 5, 1985, Pat. No. 4,596,113.

[51] Int. Cl.$^4$ ............................................. A01B 33/06
[52] U.S. Cl. .................................... 172/102; 172/54.5; 172/748; 56/400.01; 56/400.21
[58] Field of Search ........... 56/400.01, 400.02, 400.04, 56/400.05; 400.16, 400.21; 172/54.5, 102, 712, 748

[56] References Cited

U.S. PATENT DOCUMENTS

| 152,807 | 7/1874 | Nason | 172/748 |
| 273,105 | 2/1883 | Kenton | 172/748 |
| 350,724 | 10/1886 | Davies | 172/748 |
| 4,051,903 | 10/1977 | Van der Lely | 172/102 |
| 4,187,914 | 2/1980 | Van der Lely | 172/102 |
| 4,596,113 | 6/1986 | Novoselsky | 56/400.16 |

FOREIGN PATENT DOCUMENTS

| 327892 | 10/1919 | Fed. Rep. of Germany | 172/748 |
| 139647 | 12/1950 | United Kingdom | 172/54.5 |

Primary Examiner—Gene Mancene
Assistant Examiner—John G. Weiss
Attorney, Agent, or Firm—Karl F. Ross; Herbert Dubno

[57] ABSTRACT

A power rake having independently pivotal tines mounted on a common member which is displaced relative to a tractor-carried support in an orbital or cyclical manner. Each of the tines has an eccentric portion designed so that the tine moves through the soil on edge during at least part of its travel and has a broad side engaging the soil over part of its travel.

15 Claims, 6 Drawing Figures

POWER RAKE

CROSS REFERENCE TO RELATED APPLICATION

This application is a continuation-in-part of my copending application Ser. No. 720,260 filed Apr. 5 1985 now U.S. Pat. No. 4,596,113.

FIELD OF THE INVENTION

My present invention relates to a rake and, more particularly, to a power rake which is especially useful as a soil tilling implement for large-scale soil cultivation although it also may be used for small-scale soil cultivation and even the movement of granular, particulate and finely divided materials.

BACKGROUND OF THE INVENTION

As pointed out in my earlier application, which is hereby incorporated in its entirety by reference, a rake is a commonly used tool in agriculture, horticulture, soil preparation, and ground maintenance and for other purposes in which an array of tines is displaced in a combing action generally along the ground. Generally speaking, the tines of the rake are fixed with respect to a carrier for the tines although there are manual rakes known which allow the spacing of the tines to be adjusted by, for example, shifting of the tines with respect to the support to move them closer together or further apart.

However, both manual rakes and various forms of soil tilling implements using rake principles, such as spike harrows, fix the tines with respect to the support at least for a given soil preparation operation so that they are in effect fixed-tine implements.

The soil preparation efficiency with fixed-tine implements is not great and the aforementioned copending application points out that the efficiency of soil preparation can be greatly improved, that the versatility of an implement with respect to raking functions may likewise be enhanced and the soil preparation utilizing a rake action can be simplified if the rake is provided with self-orienting tines, pivotally generally about upright axes and designed to selectively present broad and narrow sides to the soil to be moved or acted upon.

Specifically that application discloses a manual rake having a transverse member (support) adapted to be displaced substantially parallel to the ground and having a multiplicity of spaced-apart tines projecting downwardly from this support, and means for pivotally mounting each tine about a respective axis transverse to the support and representing a longitudinal axis of the tine.

Advantageously, each tine is provided with a groundengaging portion which is eccentric with respect to its axis so that when the rake is drawn in one direction along the ground, torsional force (torque) is applied to each tine tending to rotate it in one direction or sense whereas when the rake is displaced in the opposite direction along the ground, each tine swings into a second position which can present a broad side to the ground.

Stop means is provided on the support for immobilizing tines in each of these limiting positions so that when the tines are retained in one of these positions, they may assume an on-edge orientation with respect to the direction of displacement and thereby slice through the soil, whereas when swung in the opposite sense and there held, the tines may present broad surfaces to the direction of displacement and thereby displace a large amount of material.

The alternation of groove cutting and broad-side displacement has been found to be energetically efficient because the broad-side displacement, which involves most work, is easier and less energy consuming after the grooves have been previously formed by the slicing action.

Advantageously, the tines described in that application are flat blades having free pointed ends offset from the axes of the blades, the blades having laterally projecting tabs which engage pins depending from the support and forming the stops.

This manual rake is especially effective when manipulated with a back-and-forth motion so that the support moves horizontally, perpendicular to itself, forward and back to pulverize and work the ground.

OBJECTS OF THE INVENTION

It is the principal object of the present invention to provide an implement which advances the principles set forth in the above-identified application.

Another object of my invention is to provide a power rake which can be used for larger scale soil preparation than the manual rake described in the aforementioned application.

It is also an object of the invention to provide a large-scale soil working implement which permits plowing, disc harrowing and spike harrowing to be dispensed within soil preparation.

SUMMARY OF THE INVENTION

These objects and others which will become more readily apparent hereinafter are attained in accordance with the present invention in a power rake which comprises:

a support displaceable over the ground and, most advantageously, towed or carried by a tractor or similar vehicle at least one transverse member mounted on the support and displaceable thereon in a cyclical pattern with at least part of the cyclical pattern of displacement including a generally forward component of movement and a generally rearward component of movement with respect to a direction of travel of the support, and a multiplicity of spaced-apart tines projecting downwardly from the transverse member and pivotally mounted thereon so that each tine can rotate individually about a respective axis transversely of the member and representing a longitudinal axis of the tine as the member is moved relative to the support.

Advantageously, a drive mechanism is coupled to the transport member for displacing same in the cyclical pattern, the mechanism including an engine or motor on the support, a power takoff from a tractor or other vehicle, or a coupling to a wheel which is driven as the implement is drawn along the ground.

Each tine can be provided with a ground-engaging portion which is eccentric with respect to its longitudinal axis so that when the support is displaced in one direction, i.e., in the direction of travel or opposite the direction of travel, torsional force is applied to each tine tending to rotate it in one direction whereas when the transverse member is displaced in the opposite direction, the tines swing into respective second positions.

Stop means is provided on each transverse member for halting the tines in each of these limiting positions so that while they may be turned broad side to the direction of travel in one position, upon displacement into the opposite position, they assume at least temporarily an on-edge orientation to the direction of travel of the support. In this position they slice through the ground.

The cyclical pattern will depend upon the width of the implement and the nature of the transverse member. For example, the transverse member can be a bar mounted on the support transversely of the direction of travel in which the implement is drawn and pivotally mounted on it, ends upon a pair of cranks which ensure the cyclical displacement of the bar parallel to itself.

Alternatively, rotating discs can carry the tines. In that case, each disc can be provided with a plurality of angularly-spaced tines.

A bar may form one member of a frame which can have a plurality of parallel bars each equipped with a respective array of such tines, the tines of one array being offset transversely of the direction of travel from the tines of the next array in the travel direction.

It has been found to be advantageous to equip each implement with two such frames or bars and displace them mirror symmetrically with respect to a longitudinal median plane through the implement so that the reaction force transferred by each bar or frame to the support is balanced by substantially equal and opposite forces from the other bar or frame.

As described in the aforementioned application, moreover, the shank of each blade can be welded within a tube and the tube can be surrounded by a nylon sheath or other low-friction bearing means and received within a cylindrical sleeve welded to the iron transverse member which, when it is a bar, can be an angle iron or the like. The latter can be provided with bores aligned with the sleeves and through which the shanks are inserted.

Cotter pins or like removable means may be provided to hold the shanks in place, the blades being removable upon extraction of the cotter pin for blade replacement as need arises.

BRIEF DESCRIPTION OF THE DRAWING

The above and other objects, features and advantages of the present invention will become more readily apparent from the following description, reference being made to the accompanying drawing in which.

DESCRIPTION

Figure 1:
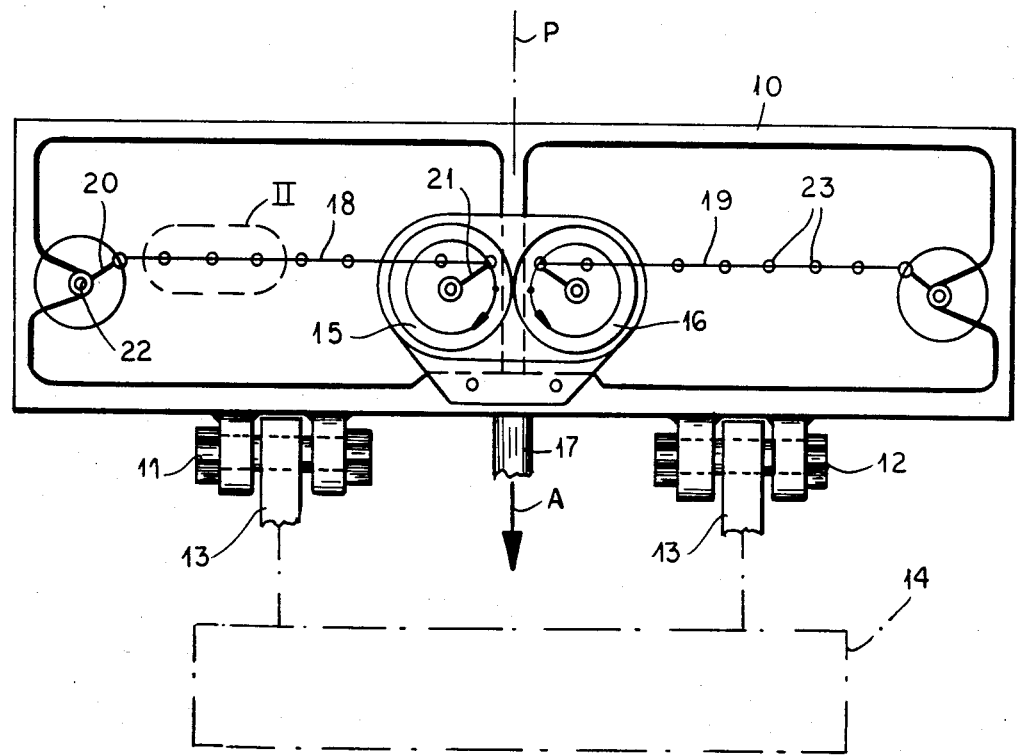
FIG. 1 is a diagrammatic plan view illustrating a power rake according to the invention in which on each side of a longitudinal plane of the implement a single-bar array of the tines is provided.

As can be seen from FIG. 1, the basic elements of an implement according to the invention include a support 10 in the form of a frame carried by pivots 11, 12 by the hitch 13 of a tractor represented only by the dot-dash box 14 in FIG. 1, this implement being displaceable in a travel direction A with respect to the ground and having a pair of meshing gears 15, 16 driven by a drive mechanism such as an internal combustion engine or motor carried by the implement or a power take off shaft 17 coupled to the power takeoff output of the tractor.

Naturally the implement shown in FIG. 1 can be made of a size enabling it to cover a swath ranging from the width of the tractor to the width of the swath covered by conventional spike harrow or set of discs forming a disc harrow. However, it can also be provided in a smaller configuration for use in a garden tractor or even in a hand-guided implement analagous to a garden tiller.

In all cases, however, the support 10 is displaceable over the ground in a travel direction and carries, movably mounted on the support, a cyclically displaceable member, here represented as a pair of bars 18, 19 pivotally connected at their ends to respective cranks 20, 21. One of these cranks is carried by the shaft of each gear 15, 16 while the other crank 20 is journaled at 22 on the support 10.

Figure 4:
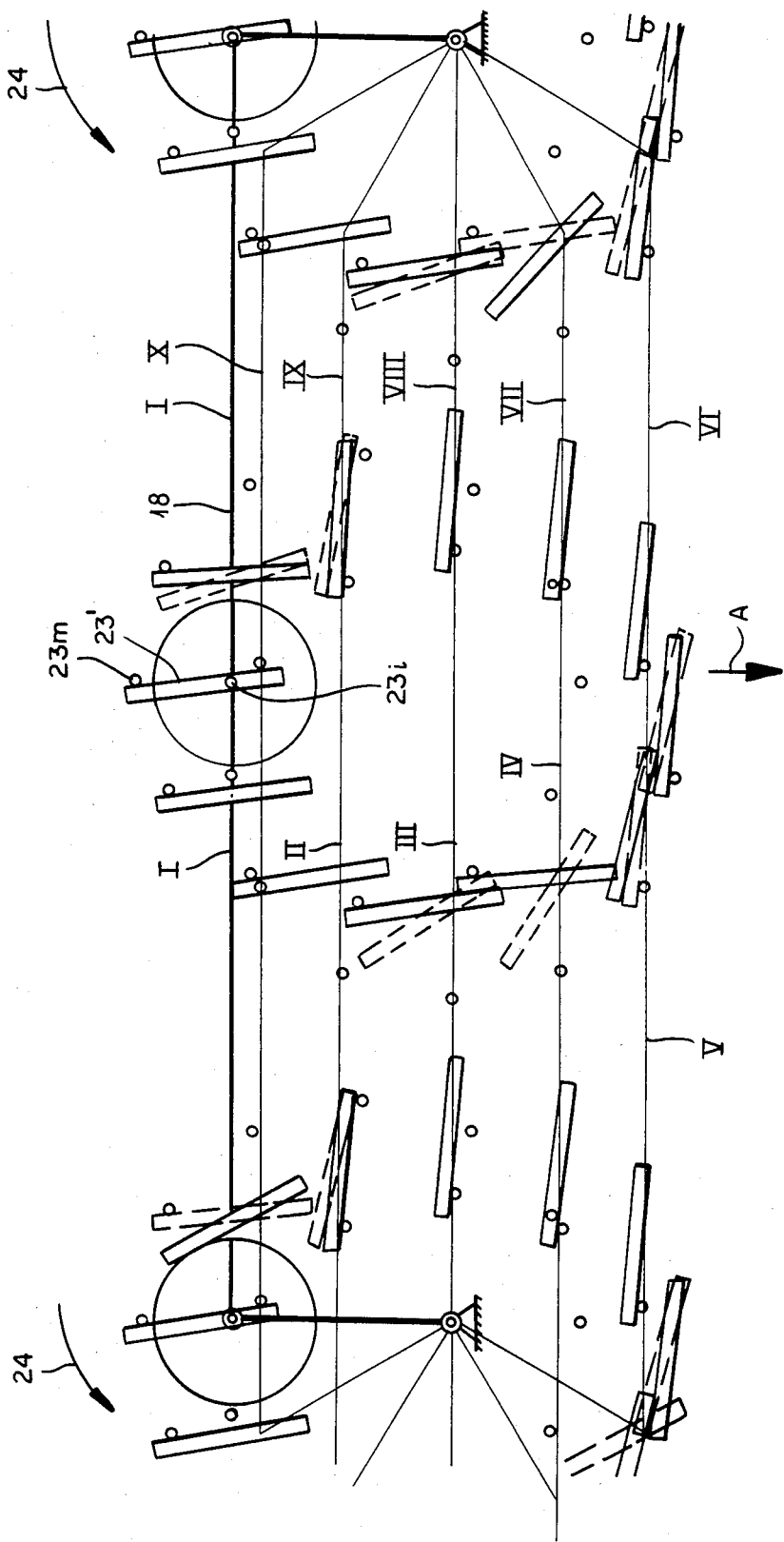
FIG. 4 is a diagram showing the pattern of movement of the tines for the device of FIG. 1.

The cyclical pattern of movement is represented by the successive positions of the tines shown in FIG. 4 for a three-tine array on the bar.

More generally, each bar 18, 19 comprises a multiplicity of equispaced but individual tine assemblies 23.

Figure 2:
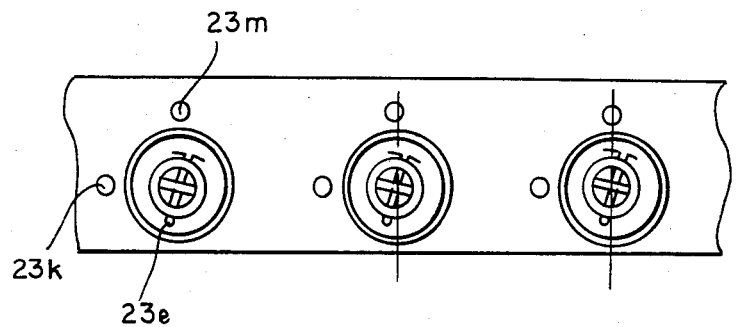
FIG. 2 is a plan view representing a detail of the region shown at II in FIG. 1.
Figure 3:
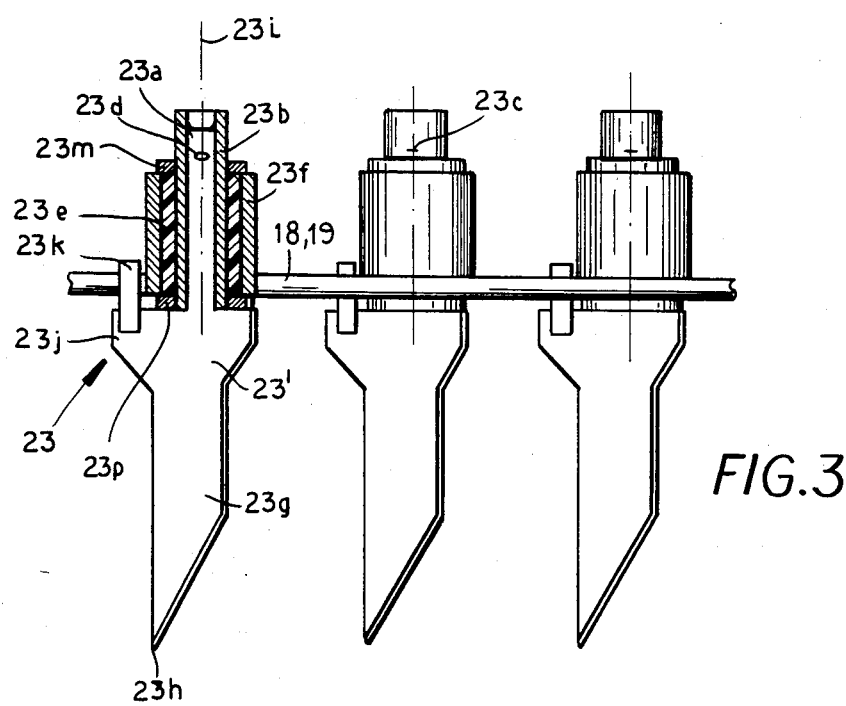
FIG. 3 is an elevational view of the detail of FIG. 2 showing the journaling of one tine with the sleeves thereof broken away.

As can be seen from FIGS. 2 and 3, each tine assembly 23 comprises a tine 23', having a shank 23a received in and welded to a tubular shaft 23b. The shaft and the shank are provided with transverse holes 23c, 23d through which a cotter pin 23e can be inserted to hold the shaft 23b within a nylon bushing 23e disposed in a metal sleeve 23f welded to the bar 18, 19 constituting the transverse member.

The shank 23a is unitary with a comparatively wide blade 23g having a point 23h which is offset from the longitudinal axis 23i about which the tine is pivotal. The blade has a projection or lug 23j which is swingable between two pins 23k and 23m defining the limiting steps for the tine.

A pair of washers 23n and 23p straddle the bushing 23e and flank the ends of the sleeve 23f to prevent axial displacement of each tine.

Since the point is offset from the axis of each tine, the pattern described by the tines as a bar 18 or 19 is displaced in a cyclical pattern as shown in FIG. 4. If it is assumed that the axis for the tine 23' at the upper center is located at 23i and the bar 18 is cyclically moved as represented by the arrows 24 to assume progressively positions I, II, III, IV, V, VI, VII, VIII, IX and X before returning to the position I, it will be apparent that the torque exerted upon the tine in the 12 o'clock position as a result of this displacement will cause the tine to bear against the stop 23n and thus as an implement is displaced in the direction of arrow A, the tines will slice through the ground in movement through the 11, 10, 9, 8 and 7 o'clock positions, until the movement of the axis of the tine toward the right begins, whereupon the tine will assume a broadside position at the 6 o'clock location, maintaining this somewhat broadside configuration until approximately the one o'clock position is again reached.

As a consequence, the tilling action to which the soil is subject is in part a slicing action and in part a shoveling action so that the power rake of the invention operates both as a disc harrow and as a spike harrow, but also partly as a plow, disposing with the need for all three implements.

Indeed, when repeated travel over the ground sufficiently works the soil so that the resistance to the movement of the tines is reduced, the plough-like action during early passes is converted into raking action in the manner described in the aforementioned application. It is even possible to detect when soil preparation is complete in accordance with the invention by watching the pivoting action of the tines since a reduction in the resistance permits the tines to pivot more freely and will signal when soil preparation is complete.

Figure 6:
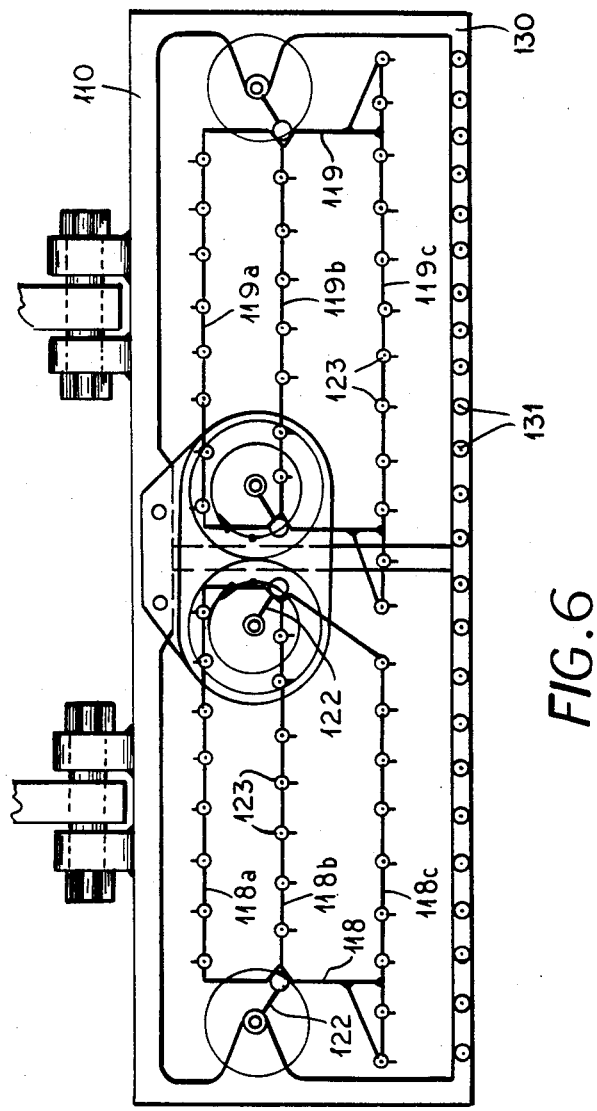
FIG. 6 is a diagrammatic plan view of yet a third embodiment of the invention.

Naturally, the number of passes can be reduced or the rate at which the bar orbits in its cyclical pattern can be slowed for a given degree of soil preparation per pass if, instead of a single bar, a pair of frames 118, 119 is supported by each pair of cranks 121, 122 on the support 110 as seen in FIG. 6.

In this case, three movable bars 118a, 118b, 118c or 119a, 119b, 119c can be provided in each frame one behind the other with respect to the direction of travel of the implement and the assemblies 123 on each car can be offset from the assemblies of the preceding bar in the direction of travel so that each assembly of one bar lies between assemblies of another bar to improve the ground coverage.

In addition, the rear beam 130 of the support may be provided with additional tine assemblies 131 which are also pivotal between stops in the manner described.

It is possible to provide the tines which subsequently engage the soil so that these are of greater height or are longer than the tines which engage the soil earlier to increase the depth of penetration.

In the two embodiments described, the amount of energy required for soil preparation is greatly reduced because of the combined cutting and shoveling action and soil preparation can proceed more quickly.

Furthermore, seed, fertilizer or soil preparation chemicals can be applied through feeders associated with each tine and depositing material generally along the axes thereof.

It will be appreciated, further, that if wide tines are provided so that a fairly continuous broad front is applied to the material ahead of the oncoming implement, the implement can act as a shovel. It is useful for the displacement of snow or for the handling of bulk materials.

Figure 5:
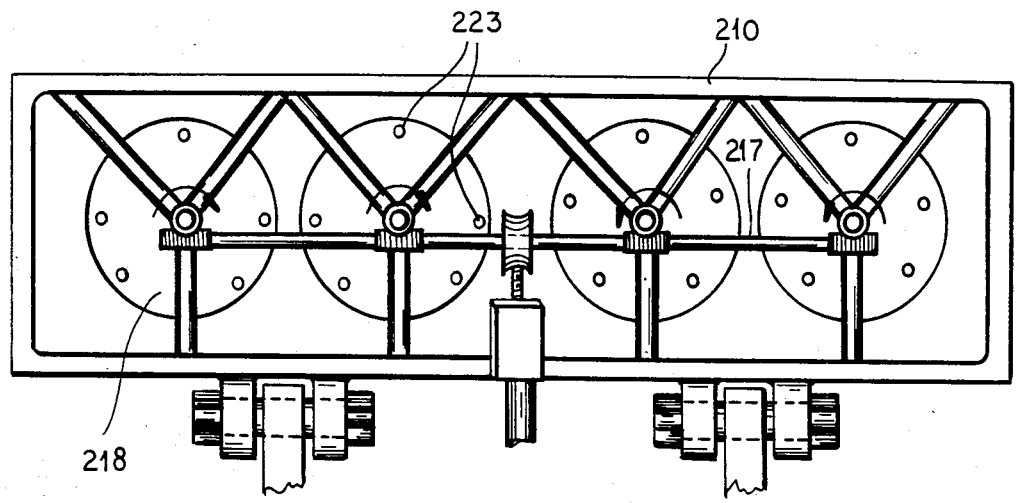
FIG. 5 is a plan view illustrating another device embodying the invention.

In FIG. 5 the tines have a similar pattern of movement, each tine assembly 223 being pivotal between stops in the manner described and a plurality of such assemblies being carried in equispaced relationship upon a respective cyclically displaceable member 218, here a disc, the tine assemblies being angularly equispaced about each disc and the discs being journaled on the support 210. A common drive 217 from the power takeoff of the tractor is provided for the discs.

In all of the embodiments described, the cyclically displaceable elements are provided mirror symmetrically with respect to a longitudinal median plane, e.g. the plane P in FIG. 1, so that reaction force from the soil against the tines can be transmitted to the support 10 in substantially equal but opposite directions and thus balance out to allow the implement to track without lateral displacement.

I claim:

1. A power rake which comprises:
    a support displaceable over the ground in a travel direction;
    at least one member mounted on said support for cyclical displacement with at least a component of said displacement being transverse to said travel direction;
    an array of mutually-spaced tines mounted on said member and engageable with the ground;
    respective means journaling each of said tines on said member for swingable displacement between two limiting positions relative to said member about a respective pivot axis transverse to said member and to the ground;
    respective stops on said member engageable with said tines in each of said positions whereby said tines are each swung into one of said positions by movement of said member and engagement of the tine with the ground during at least part of each cycle of displacement of said member and are swung into the other position upon movement of said member along another part of each cycle of displacement of said member; and
    drive means connected to said member for cyclically displacing same relative to said support.

2. The power rake defined in claim 1 wherein said member is a bar pivotally connected at its ends with a pair of eccentrics rotatable about a respective upright axis.

3. The power rake defined in claim 2 wherein a respective such bar and array of tines is provided symmetrically on opposite sides of a longitudinal median plane and said bars are driven symmetrically in opposite senses whereby reaction forces of said support resulting from the engagement of said tines with the ground are balanced.

4. The power rake defined in claim 2 wherein said bar forms part of a frame comprising a plurality of such bars spaced apart in said direction of travel, each of said bars having an array of said tines spaced apart transverse to said direction of travel.

5. The power rake defined in claim 4 wherein the tines of one bar are offset along the bar to lie between the tines of another bar of said frame.

6. The power rake defined in claim 5 wherein said frame is formed with an array of said tines which are fixed with respect to said support.

7. The power rake defined in claim 1 wherein each of said tines has a point engageable with the ground and offset from the respective axis.

8. The power rake defined in claim 7 wherein each of said tines is formed with a shank remote from said point and is formed with a respective bearing surrounding each shank and pivotally mounting the tine on said member.

9. The power rake defined in claim 8 wherein each of said tines is formed with a generally flat blade integral with the respective shank.

10. The power rake defined in claim 9, further comprising a tubular shaft surrounding each shank and welded thereto.

11. The power rake defined in claim 10 wherein said support is provided with means for attaching said support to a tractor.

12. The power rake defined in claim 10 wherein said member is formed with a multiplicity of spaced-apart sleeves each adapted to receive a respective one of said tubular shafts.

13. The power rake defined in claim 12 wherein said stops are pins fixed to said member and engageable by a lug projecting from the respective blade.

14. The power rake defined in claim 13, further comprising a respective bearing sleeve interposed between each tubular shaft and the respective sleeve formed on said member.

15. The power rake defined in claim 14, further comprising means for retaining the respective shaft and tine replaceably in each sleeve formed on said member.

* * * * *